United States Patent
Kinoshita et al.

(10) Patent No.: US 11,150,643 B2
(45) Date of Patent: Oct. 19, 2021

(54) SYSTEMS AND METHODS FOR REMOTE CONTROL BY MULTIPLE OPERATORS

(71) Applicant: Honda Motor Co., Ltd., Tokyo (JP)

(72) Inventors: Shuhei Kinoshita, Sunnyvale, CA (US); Shinichi Akama, Cupertino, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 289 days.

(21) Appl. No.: 16/287,340

(22) Filed: Feb. 27, 2019

(65) Prior Publication Data
US 2020/0272145 A1    Aug. 27, 2020

(51) Int. Cl.
G05D 1/00 (2006.01)
B60T 7/12 (2006.01)
H04W 36/14 (2009.01)

(52) U.S. Cl.
CPC .......... *G05D 1/0022* (2013.01); *H04W 36/14* (2013.01); *G05D 2201/0213* (2013.01)

(58) Field of Classification Search
CPC ...... G05D 1/00; G05D 1/0022; G05D 1/0038; G01C 21/34; G06F 19/00; G06Q 40/08; G07B 15/06; A63F 9/00; G08G 1/0967; H04L 29/06; B60T 7/12
See application file for complete search history.

(56) References Cited

U.S. PATENT DOCUMENTS

| | | | |
|---|---|---|---|
| 3,790,169 A * | 2/1974 | Brown | A63F 9/24 463/59 |
| 8,421,590 B2 | 4/2013 | Taki et al. | |
| 9,571,539 B2 * | 2/2017 | Sawato | H04L 51/20 |
| 10,417,834 B2 * | 9/2019 | Buchheim | G07B 15/063 |
| 10,699,347 B1 * | 6/2020 | Slusar | G06Q 40/08 |
| 2010/0138082 A1 * | 6/2010 | Ohta | B62D 1/02 701/2 |
| 2011/0298638 A1 * | 12/2011 | Groeneweg | G08G 1/096775 340/905 |
| 2014/0207535 A1 | 7/2014 | Stefan et al. | |
| 2017/0308080 A1 * | 10/2017 | Brooks | G05D 1/0027 |

(Continued)

FOREIGN PATENT DOCUMENTS

| | | | |
|---|---|---|---|
| JP | 2018095122 A * | 6/2018 | B60T 7/12 |
| WO | 2017125788 | 7/2017 | |

*Primary Examiner* — Yuri Kan
(74) *Attorney, Agent, or Firm* — Rankin, Hill & Clark LLP

(57) ABSTRACT

The systems and methods are generally directed to remote control of a vehicle by multiple operators. The vehicle is traveling on a roadway parsed into a plurality of segments including a first segment and a second segment. The method includes receiving vehicle data. The method includes assigning a set of one or more operators of the plurality of operators to each segment of the plurality of segments. The plurality of operators includes a first set of operators assigned to the first segment and second set of operators assigned to the second segment. The method includes identifying a control shift region having a first boundary and a second boundary. The method includes selectively shifting control from the first set of operators to the second set of operators upon reaching the first boundary such that the first set of operators and the second set of operators exert shared control in the control shift region.

17 Claims, 5 Drawing Sheets

(56) References Cited

U.S. PATENT DOCUMENTS

| | | |
|---|---|---|
| 2018/0046186 A1* | 2/2018 | Miller .................. B60W 10/06 |
| 2018/0074490 A1 | 3/2018 | Park |
| 2018/0136649 A1 | 5/2018 | Phillips |
| 2018/0196427 A1 | 7/2018 | Majumdar et al. |
| 2018/0210439 A1 | 7/2018 | Brooks et al. |
| 2018/0284759 A1 | 10/2018 | Michalakis et al. |
| 2019/0195644 A1* | 6/2019 | Scheufler ............. G05D 1/0276 |
| 2019/0294160 A1* | 9/2019 | Shintani ............. G01C 21/3407 |

* cited by examiner

SYSTEMS AND METHODS FOR REMOTE CONTROL BY MULTIPLE OPERATORS

BACKGROUND

Remotely operated vehicles are becoming more common and more mainstream. Historically, remotely controlled vehicles have been used in military applications. Increasingly there are a variety of additional uses for remotely operated vehicles in industrial, entertainment, and recreation applications, such that even if the vehicle includes an occupant, the vehicle occupant may not directly assert control over the vehicle. The vehicle being remotely controlled by operators can lead to numerous issues for the vehicle occupant. For example, shifting control between the operators may be inconsistent or erratic. Moreover, the shifting control between multiple operators can be jarring and/or confusing to the vehicle occupant.

BRIEF DESCRIPTION

According to one or more aspects, a computer-implemented method for remote control of a vehicle by a plurality of operators is provided. The vehicle is traveling on a roadway parsed into a plurality of segments including a first segment and a second segment. The method includes receiving vehicle data. The method includes assigning a set of one or more operators of the plurality of operators to each segment of the plurality of segments. The plurality of operators includes a first set of operators assigned to the first segment and second set of operators assigned to the second segment. The method includes identifying a control shift region having a first boundary and a second boundary. The method includes selectively shifting control from the first set of operators to the second set of operators upon reaching the first boundary such that the first set of operators and the second set of operators exert shared control in the control shift region.

According to one or more aspects, a system for remote control of a vehicle by a plurality of operators is provided. The system includes a data receiving module, an assignment module, and a control shift module. The data receiving module receives vehicle data for a vehicle. The vehicle is traveling on a roadway parsed into a plurality of segments including a first segment and a second segment. The segments of the plurality of segments having a lead terminal and an end terminal. The assignment module assigns a set of one or more operators of the plurality of operators to each segment of the plurality of segments. The plurality of operators includes a first set of operators assigned to the first segment and a second set of operators assigned to the second segment. The set of one or more operators is assigned to a segment to remotely operate the vehicle in the segment. The control shift module identifies a control shift region having a first boundary and a second boundary and selectively shifting control from the first set of operators to the second set of operators upon reaching the first boundary. The first boundary precedes the end terminal of the first segment and follows the lead terminal of the segment. The first set of operators and the second set of operators exert shared control in the control shift region.

According to one or more aspects, non-transitory computer-readable storage medium storing instructions that, when executed by a computer, causes the computer to perform a method for remote control of a vehicle by a plurality of operators is provided. The vehicle is traveling on a roadway parsed into a plurality of segments including a first segment and a second segment. The segments of the plurality of segments each have a lead terminal and an end terminal. The method includes receiving vehicle data for the vehicle. The method also includes assigning a set of one or more operators of the plurality of operators to each segment of the plurality of segments. The plurality of operators includes a first set of operators assigned to the first segment and a second set of operators assigned to the second segment. The set of one or more operators is assigned to a segment to remotely operate the vehicle in that segment. The method also includes identifying a control shift region having a first boundary and a second boundary. The first boundary precedes the end terminal of the first segment and follows the lead terminal of the segment. The method further includes selectively shifting control from the first set of operators to the second set of operators upon reaching the first boundary such that the first set of operators and the second set of operators exert shared control in the control shift region.

DETAILED DESCRIPTION

Figure 1:
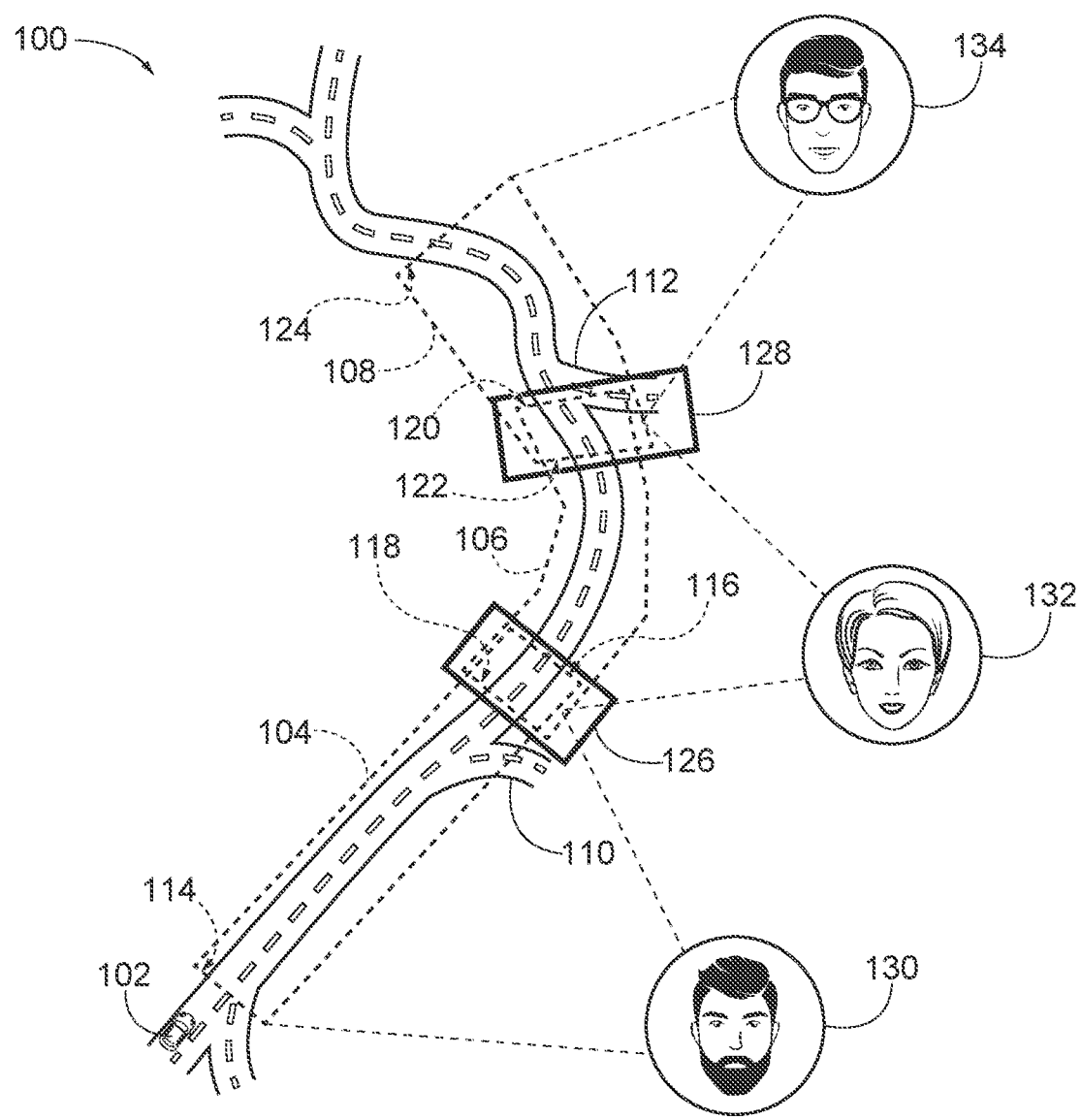
FIG. 1 is a schematic view of an exemplary traffic scenario on a roadway having a plurality of segments according to an exemplary embodiment.

Generally, the systems and methods disclosed herein are directed to remote control of a vehicle by multiple operators. In particular, the systems and methods described herein address the anxiety of a vehicle occupant caused by shifting the remote control of the vehicle between the multiple operators. For example, the change is conducted in a manner to gradually shift control from one operator to another in a given region. Furthermore, the multiple operators may control the vehicle over a predetermined timeframe. Suppose that three or more operators are coordinating remote control of the vehicle, driving decisions may be determined collectively. In one embodiment, driving decisions may be made based on a majority decision. In another embodiment, the driving decisions may be made by determining the average operation of each of the three or more operators.

Definitions

The following includes definitions of selected terms employed herein. The definitions include various examples and/or forms of components that fall within the scope of a term and that can be used for implementation. The examples are not intended to be limiting. Furthermore, the components discussed herein, can be combined, omitted, or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wide-band (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein can include input and/or output devices for receiving input and/or devices for outputting data. The input and/or output can be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface, which can be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be accessible through various devices, for example, though a remote system. The display may also be physically located on a portable device, mobility device, or vehicle.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operator," as used herein, is an entity that at least partially operates a vehicle remotely. For example, the operator may be a human, a virtual driver, a digital assistant, or a driving program of a remote server, among other entities that can remotely control a vehicle. Accordingly, the operator is physically separated from the vehicle. The operator may be a single entity or include multiple entities, such as, multiple humans or a human utilizing a driving program.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more users and is powered by any form of energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more users and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more users. Further, the term "vehicle" can include vehicles that are automated or non-automated with pre-determined paths or free-moving vehicles.

A "vehicle occupant," as used herein can include, but is not limited to, one or more biological beings located in the vehicle. The vehicle occupant can be a driver or a passenger of the vehicle. The vehicle occupant can be a human (e.g., an adult, a child, an infant).

"Vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

Referring now to the drawings, the showings are for purposes of illustrating one or more exemplary embodiments and not for purposes of limiting the same. FIG. 1 is a schematic view of an exemplary travel scenario on a roadway 100. The roadway 100 can be any type of path, road, highway, freeway, or travel route. In FIG. 1, the roadway 100 includes two lanes, however, the roadway 100 can have various configurations not shown in FIG. 1. For example, the roadway 100 can have any number of lanes. The roadway 100 is traversed by one or more vehicles, such as a vehicle 102.

In FIG. 1, the roadway 100 is parsed into a plurality of segments including a first segment 104, a second segment 106, and a third segment 108. The segments include a portion of the roadway 100. For example, a segment may include a longitudinal portion of the roadway 100. The segments may include a portion of one or more of the lanes of the roadway 100. Here, the first segment 104 includes a longitudinal portion of each of the lanes. The second segment 106 longitudinally follows the first segment 104, and likewise includes a longitudinal portion of each of the lanes of the roadway 100. The third segment 108 longitudinally follows the second segment 106, and also includes a longitudinal portion of each of the lanes.

In some embodiments, the segments may be defined to have a consistent length. Alternatively, the length of the segments may be defined by road features. The road features are features on the roadway 100 that affect the traffic pattern. For example, the road features may include an on-ramp, an off-ramp, a lane ending, a collision, debris, a disabled vehicle, a lane closure, or the number of lanes increasing or decreasing on the roadway 100, among other features that may cause a vehicle to alter its speed, direction, or lane on the roadway 100. The road features may be identified based on information received from a position determination unit 218 (shown in FIG. 2), computer communication between vehicles traveling on the roadway 100, and data received from the vehicle 102, among others.

Here, the road features of the roadway 100 includes an off-ramp 110 and an on-ramp 112. The road segment may be positioned at or after road features. For example, the first segment 104 is positioned before the off-ramp 110 and the third segment is positioned after the on-ramp 112. In another embodiment, a segment may be situated between two road features. For example, the second segment 106 is positioned between the off-ramp 110 and the on-ramp 112. Accordingly, the length of the segments may be based on the distance between road features. As shown, the roadway segments may have different lengths. For example, the first segment 104 and the second segment 106 are longer than the third segment 108.

The segments of the plurality of segments are longitudinally bounded by terminals. For example, each of the segments have a lead terminal that is a leading edge of the segment in a longitudinal direction of travel of the vehicle 102. Each of the segments may also have an end terminal that is a terminating edge of the segment in the longitudinal direction of travel of the vehicle 102. For example, the first segment 104 has a lead terminal 114 and an end terminal 116, the second segment 106 has a lead terminal 118 and an end terminal 120, and the third segment 108 has a lead terminal 122 and an end terminal 124.

In some embodiments, the first segment 104 and the second segment 106 may overlap such that the end terminal 116 of the first segment 104 is farther from the vehicle 102 than the lead terminal 118 of the second segment 106. The overlapping areas of the segments are control shift regions. For example, the overlapping area of the roadway 100 between the end terminal 116 of the first segment 104 and the lead terminal 118 of the second segment 106 is a first control shift region 126. Likewise, a second control shift region 128 is the overlapping area between the second segment 106 and the third segment 108. Accordingly, the boundaries of the control shift regions may correspond to the terminals of the segments. For example, the first boundary of the first control shift region 126 corresponds to the lead terminal 118 of the second segment 106 and the second boundary of the first control shift region 126 corresponds to the end terminal 116 of the first segment 104. In another embodiment, a control shift region may separate two adjacent segments, such that a portion of the control shift region is positioned in an area of the roadway 100 that does not contain a segment.

Operators remotely control the vehicle 102 in their assigned segment. When the vehicle 102 traverses a control shift region, the control of the vehicle 102 shifts from one operator to another. The operator may remotely control the vehicle 102 using a device to operate the vehicle 102 wirelessly from a distance. Each of the actions of the vehicle 102 may be individually or generally directed by the operator. Additionally or alternatively, the operator may utilize the capabilities of the vehicle 102 to assist the vehicle 102 in autonomous functioning. In another embodiment, the remote control may include monitoring the vehicle 102 while the vehicle functions, at least partially, autonomously.

The operators are assigned to the segments of the plurality of segments. For example, a first operator 130 is assigned to the first segment 104, a second operator 132 is assigned to the second segment 106, and a third operator 134 is assigned to the third segment 108. The operators are remotely located from the vehicle 102 and remotely, at least partially, control the vehicle 102. For example, the operator may control one or more of vehicle systems 208 and/or vehicle sensors 210 (shown in FIG. 2). The operator may be able to remotely drive the vehicle using autonomous functionality including driver assistance, partial automation, conditional automation, high automation, or full automation facilitated by the operator. For example, in jurisdictions where driver back-up is required to utilize autonomous functionality, the operator may serve as the driver back-up.

Figure 2:
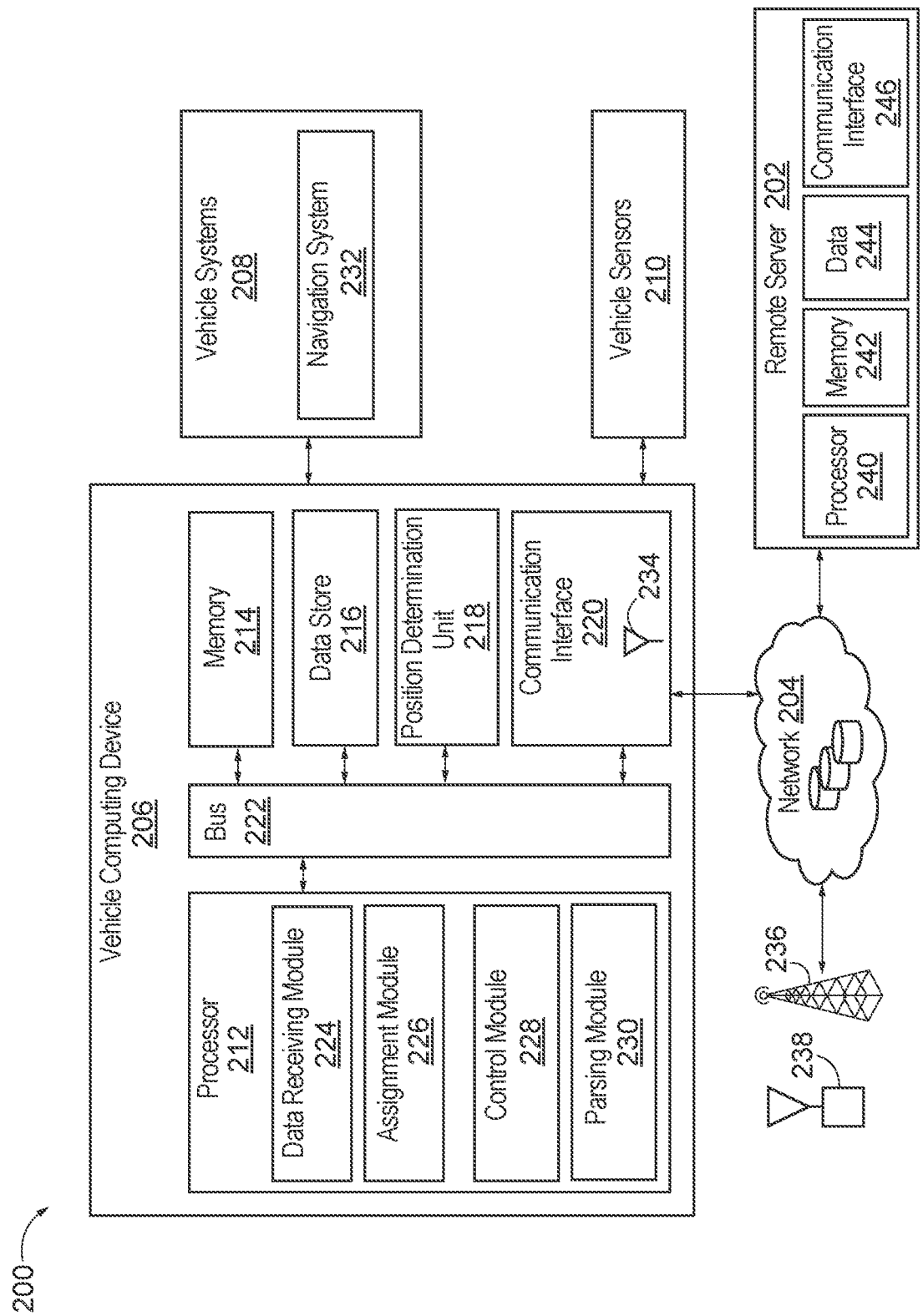
FIG. 2 is a block diagram of an operating environment for remote control of a vehicle by multiple operators according to an exemplary embodiment.

Referring now to FIG. 2, a schematic view of an operating environment 200 for the vehicle 102 according to an exemplary embodiment is shown. One or more of the components of the operating environment 200 can be considered in whole or in part a vehicle communication network. The vehicle 102 communicates with a remote server 202 over a communications network 204. The vehicle 102 includes a vehicle computing device (VCD) 206, vehicle systems 208, and vehicle sensors 210. Generally, the VCD 206 includes a processor 212, a memory 214, a data store 216, a position determination unit 218, and a communication interface 220, which are each operably connected for computer communication via a bus 222 and/or other wired and wireless technologies defined herein. Referring again to the vehicle 102, the VCD 206, can include provisions for processing, communicating, and interacting with various components of the vehicle 102 and other components of the operating environment 200. In one embodiment, the VCD 206 can be implemented with the vehicle 102, for example, as part of a telematics unit, a head unit, an infotainment unit, an electronic control unit, an on-board unit, or as part of a specific vehicle control system, among others. In other embodiments, the VCD 206 can be implemented remotely from the vehicle 102, for example, with a portable device (not shown), a remote device (not shown), or the remote server 202, connected via the communications network 204.

The processor 212 can include logic circuitry with hardware, firmware, and software architecture frameworks for remote control of the vehicle 102 by multiple operators. Thus, in some embodiments, the processor 212 can store application frameworks, kernels, libraries, drivers, application program interfaces, among others, to execute and control hardware and functions discussed herein. For example, the processor 212 can include a data receiving module 224, an assignment module 226, a control module 228, and a parsing module 230, although it is understood that the processor 212 can be configured into other architectures. Further, in some embodiments, the memory 214 and/or the data store 216 can store similar components as the processor 212 for execution by the processor 212.

The modules of the processor 212 may access the position determination unit 218 via the bus 222. The position determination unit 218 can include hardware (e.g., sensors) and software to determine and/or acquire position data about the vehicle 102. For example, the position determination unit 218 can include a global positioning system (GPS) unit (not shown) and/or an inertial measurement unit (IMU) (not shown). Thus, the position determination unit 218 can provide a geo-position of the vehicle 102 based on satellite data from, for example, a global position source (not shown), or from any Global Navigational Satellite infrastructure (GNSS), including GPS, Glonass (Russian) and/or Galileo (European). Further, the position determination unit 218 can provide dead-reckoning data or motion data from, for example, a gyroscope, accelerometer, magnetometers, among other vehicle sensors 210. In some embodiments, the position determination unit 218 can be a component of the navigation system 232 of the vehicle systems 208 that provides navigation maps and navigation information to the vehicle 102.

The communication interface 220 can include software and hardware to facilitate data input and output between the components of the VCD 206 and other components of the operating environment 200. Specifically, the communication interface 220 can include network interface controllers (not shown) and other hardware and software that manages and/or monitors connections and controls bi-directional data transfer between the communication interface 220 and other components of the operating environment 200 using, for example, the communication network 204.

More specifically, in one embodiment, the VCD 206 can exchange data and/or transmit messages with other compatible vehicles and/or devices via a transceiver 234 or other communication hardware and protocols. For example, the transceiver 234 can exchange data with an operator, such as the first operator 130. In some embodiments, the vehicle 102 and the first operator 130 can also exchange data (e.g., vehicle data as will be described herein) over remote networks by utilizing a wireless network antenna 236, roadside equipment 238, and/or the communication network 204 (e.g., a wireless communication network), or other wireless network connections.

In some embodiments, data transmission from one or more operators can be executed at and/or with other infrastructures and servers. For example, the VCD 206 can transmit and receive information, such as remote control data, roadway data, or vehicle data, directly or indirectly to and from the remote server 202 over the communication network 204. The remote server 202 can include a remote processor 240, a memory 242, data 244, and a communication interface 246 that are configured to be in communication with one another. Thus, the transceiver 234 can be used by the VCD 206 to receive and transmit information to and from one or more operators via the remote server 202 and other servers, processors, and information providers through the communication network 204. For example, the remote operator could transmit or terminate advertisements based on actions by the vehicle occupant or record and transmit vehicle data in an emergency situation. In alternative embodiments, the transceiver 234 may be a radio frequency (RF) transceiver can be used to receive and transmit information to and from the remote server 202. In some embodiments, the VCD 206 can receive and transmit information to and from the remote server 202 including, but not limited to, vehicle data, traffic data, road data, curb data, vehicle location and heading data, high-traffic event schedules, weather data, or other transport related data. In some embodiments, the remote server 202 can be linked to multiple operators (e.g., the first operator 130, the second operator 132, and/or the third operator 134), other entities, traffic infrastructures, and/or devices through a network connection, such as via the wireless network antenna 236, the roadside equipment 238, and/or other network connections.

In this manner, vehicles that are equipped with remote control systems may communicate by way of remote networks, such as the communications network 204, the wireless network antenna 236 and/or the roadside equipment 238. For example, suppose the first operator 130 is in transceiver range and communicates via the transceiver 234. However, the second operator 132 may not be within transceiver range and instead communicate using the wireless network antenna 236 and/or the roadside equipment 238. Accordingly, different operators of the plurality of operators may communicate with the vehicle 102 using the different remote networks.

Referring again to the vehicle 102, the vehicle systems 208 can include any type of vehicle control system and/or vehicle described herein to enhance the vehicle 102 and/or driving of the vehicle 102. For example, the vehicle systems 208 can include autonomous driving systems, remote control systems, driver-assist systems, adaptive cruise control systems, lane departure warning systems, merge assist systems, freeway merging, exiting, and lane-change systems, collision warning systems, integrated vehicle-based safety systems, and automatic guided vehicle systems, or any other advanced driving assistance systems (ADAS). As will be described, one or more of the vehicle systems 208 can be controlled remotely according to the systems and methods discussed herein.

The vehicle sensors 210, which can be implemented with the vehicle systems 208, can include various types of sensors for use with the vehicle 102 and/or the vehicle systems 208 for detecting and/or sensing a parameter of the vehicle 102, the vehicle systems 208, and/or the environment surrounding the vehicle 102. For example, the vehicle sensors 210 can provide data about vehicles and/or downstream objects in proximity to the vehicle 102. For example, the vehicle sensors 210 can include, but are not limited to: acceleration sensors, speed sensors, braking sensors, proximity sensors, vision sensors, ranging sensors, seat sensors, seat-belt sensors, door sensors, environmental sensors, yaw rate sensors, steering sensors, GPS sensors, among others. It is also understood that the vehicle sensors 210 can be any type of sensor, for example, acoustic, electric, environmental, optical, imaging, light, pressure, force, thermal, temperature, proximity, among others.

Using the system and network configuration discussed above, the vehicle 102 can be remotely controlled by multiple operators allowing the operators to gradually and incrementally shift control from one to another. Detailed embodiments describing exemplary methods using the system and network configuration discussed above will now be discussed in detail.

II. Methods for Remote Control by Multiple Operators

Figure 3:
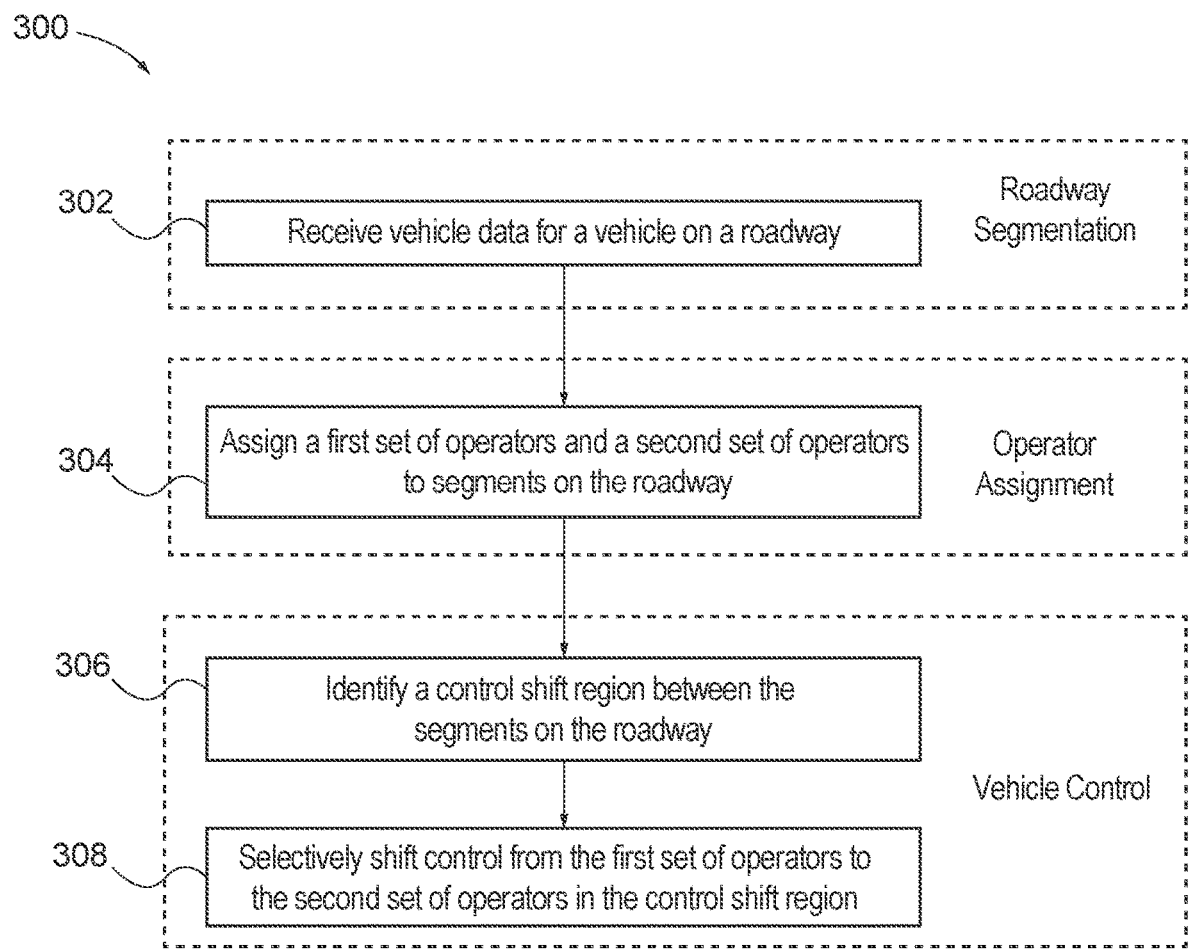
FIG. 3 is a process flow diagram of a method for remote control of a vehicle by multiple operators.

Referring now to FIG. 3, a method 300 for remote control by multiple operators will now be described according to an exemplary embodiment. FIG. 3 will also be described with reference to FIGS. 1, 2, 4, and 5. As shown in FIG. 3, the method 300 for remote control by multiple operators can be described by three stages, namely, roadway segmentation, operator assignment, and vehicle control. For simplicity, the method 300 will be described by these stages, but it is understood that the elements of the method 300 can be organized into different architectures, blocks, stages, and/or processes.

A. Roadway Segmentation

At block 302, the method 300 includes the data receiving module 224 receiving vehicle data for the vehicle 102 on a roadway. The vehicle data is information that facilitates remote control of the vehicle by an operator. The vehicle data may also be used to segment the roadway and assign operators. The vehicle data may also be used by the vehicle systems 208 to alter the manner in which the vehicle 102 operates. For example, the vehicle data may be adjustable by a vehicle occupant (not shown) or an operator to alter the acceleration or braking rates of the vehicle 102.

The vehicle data is associated with the vehicle 102, the vehicle environment, the vehicle systems 208, the roadway 100, and/or the route, and generate a data signal indicating a measurement of the vehicle data. These data signals can be converted into other data formats (e.g., numerical) and/or used by the vehicle systems 208 and/or the VCD 206 to generate other data metrics and parameters. For example, the vehicle data can include information related to the vehicle 102 including data from the vehicle systems 208 and/or the vehicle sensors 210. Exemplary vehicle data includes, but is not limited to, steering data, lane departure data, blind spot monitoring data, braking data, collision warning data, navigation data, collision mitigation data, auto cruise control data, vehicle model, vehicle make, vehicle identification number. In another example, the vehicle data may include route information such as an origin, destination, point of interest, waypoint, directions, path planning, etc. Further, the vehicle data can include data from the roadside equipment 238 and/or proximate vehicles (not shown) to the vehicle 102 accessed, for example, via the communications network 204, for example, external cameras, radar and laser sensors on other vehicles in a vehicle-to-vehicle network, street cameras, surveillance cameras, among others.

The vehicle data can also include segmentation data. The segmentation data is generally information regarding partitioning of the roadway 100 into roadway segments and may include information regarding location of roadways segments, road features, length of roadway segments, parameters for segmentation, etc. The segmentation data may be received at the data receiving module 224 as computer communication, from vehicle systems 208 such as the navigation system 232, or a global positioning system (not shown) of the position determination unit 218, among others. Accordingly, the vehicle data, including the segmentation data, describes the vehicle 102 traversing the roadway 100 parsed into a plurality of segments.

B. Operator Assignment

At block 304, the method 300 includes the assignment module 226 assigning a set of one or more operators of the plurality of operators to each segment of the plurality of segments on the roadway. For example, suppose that the plurality of operators includes a first set of operators, a second set of operators, and a third set of operators. As shown in FIG. 1, the first set of operators includes a first operator 130 assigned to the first segment 104, the second set of operators includes a second operator 132 assigned to the second segment 106, and the third set of operators includes a third operator 134 assigned to the third segment 108. Operators may be assigned to segments based on operator information including geographic region, communication and network availability, operator style (e.g., aggressive, standard, cautious, convoy, etc.), scheduling availability, network edges, length of operator availability in terms of distance and/or time, cost of engaging an operator, etc.

In one embodiment, a vehicle occupant may request one or more operators using an application, program, or software. For example, the vehicle occupant may provide an origin and/or destination on the roadway 100, and request an operator based on one or more request factors that may be hierarchal arranged in the request. For example, the vehicle occupant may prioritize the cost of engaging an operator and operator style over the length of the operator availability. In response to the request, the vehicle occupant may receive candidate operators and be able to select one or more operators for the route between the origin and the destination on the roadway 100.

In another embodiment, at least on operator from the plurality of operators may be automatically assigned to the vehicle 102 in response to the vehicle entering navigational information, entering a remote control mode, or predetermined vehicle data being identified. For example, the vehicle data may indicate that the vehicle 102 has entered an autonomous mode, which may trigger operators for the vehicle 102 being assigned to segments in the plurality of segments. In another embodiment, operators may be assigned to the vehicle 102 automatically based on the vehicle occupant and/or vehicle 102 being a member of a subscription service that offers remote control to members.

The operators assigned to a segment operate the vehicle 102 remotely while the vehicle 102 is traversing the segment. For example, the first operator 130 operates the vehicle 102 in the first segment 104, the second operator 132 operates the vehicle 102 in the second segment 106, and the third operator 134 operate the vehicle 102 in the third segment 108. The control that an operator exerts over the vehicle 102 while the vehicle 102 is in the operator's assigned segment is variable. For example, the operator may exert exclusive and complete control over the vehicle 102 in the segment. The operator may also exert shared control over the vehicle 102 or exclusive or shared control over a portion of the vehicle systems 208. For example, turning to FIG. 4, multiple operators may be assigned to one or more of the segments.

Figure 4:
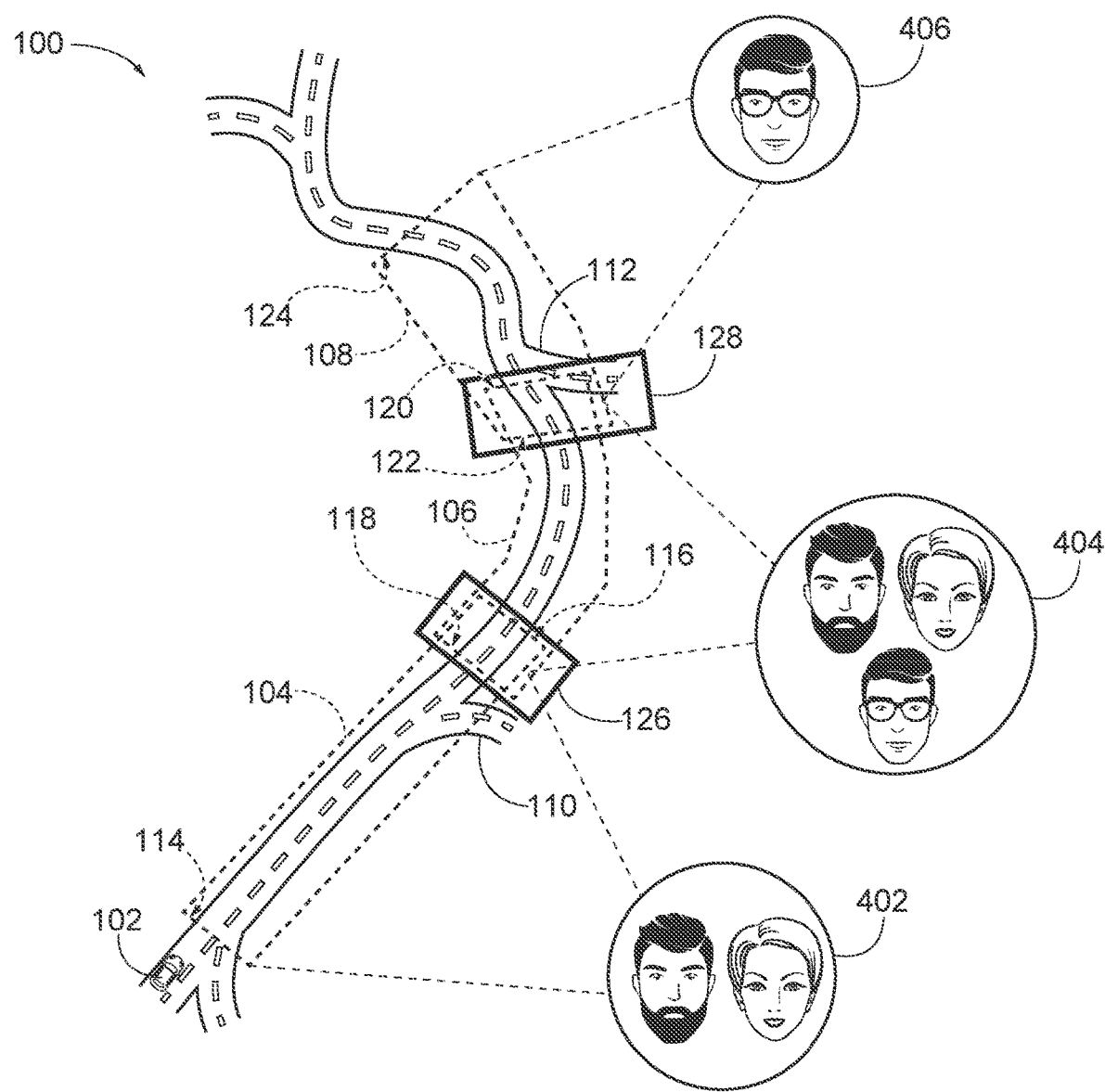
FIG. 4 is a schematic view of an exemplary traffic scenario on a roadway having multiple operators for a segment according to an exemplary embodiment.

The scenario of FIG. 4 includes some of the same or similar components and functionality as described with respect to FIG. 1. However, in FIG. 4, the operative entity is not solely a single operator, but includes operative entities that are sets of operators having one or more operators. For example, two operators are assigned to the first segment 104. In particular, the first set 402 of operators assigned to the first segment 104 may include the first operator 130 and the second operator 132. The second set 404 of operators assigned to the second segment 106 includes the first operator 130, the second operator 132, and the third operator 134. The third set of operators 406 includes the third operator 134. Therefore, a set of operators may include one or more operators, and the operators may be assigned to one or more segments of the plurality of segments.

C. Vehicle Control

The control module 228 facilitates control of the vehicle by the operators. As discussed above, vehicle operators at least partially control the vehicle. When multiple operators are assigned to a segment, the operators may share control in the segment according to one or more shared control models. In one embodiment, the control may be shared according to a defined control model. In the defined control model, operators may be responsible for specific vehicle systems or types of decisions. For example, one operator may be responsible for driving the vehicle while another may be responsible for navigation.

In another embodiment, control of the vehicle 102 may be based on a majority action model. In the majority action model, the control module 228 dissects control into discrete actions based on the vehicle data. The operators may recommend candidate actions to control the vehicle, and the control may be based on a majority of the operators. For example, suppose that the vehicle 102 is traveling in a lane of the second segment 106 and is approaching a slow moving vehicle (not shown) in the lane. The operators may have to determine whether to remain in the lane and brake, or pass the slow moving vehicle in an adjacent lane. Further suppose that the first operator 130 proposes a candidate action in which the vehicle 102 passes the slow moving vehicle, the second operator 132 proposes a candidate action in which the vehicle 102 brakes and remains in the lane, and the third operator 134 proposes a candidate action in which the vehicle 102 passes the slow moving vehicle. Because the majority of operators propose the candidate action of passing the slow moving vehicle, the control module 228 would determine the majority action is to pass the slow moving vehicle, and the vehicle 102 is controlled accordingly.

In yet another embodiment, control of the vehicle 102 may be based on an average action model. In the average action model, the average action of the candidate actions is determined. For example, the acceleration rate and the braking rate may be based on historical operator data. Suppose that the vehicle is in the first segment 104 of the roadway approaching slower traffic. Further suppose that first operator 130 has historically had a cautious style and more likely to brake sooner while the second operator 132 has historically had an aggressive style and more likely to wait to brake. The control module 228 may determine a hybrid style between the cautious style and the aggressive style. Accordingly, the control module may cause the vehicle to brake after the first operator 130 typically would, but before the second operator 132 typically would. Thus, the control module 228 can use vehicle data as well as operator data about the operators to control the vehicle 102. However, the sets of operators include different operative entities, the control of the vehicle 102 shifts from one set of operators to the next set of operators as the vehicle 102 traverses the roadway 100.

Returning to FIG. 3, at block 306, the method 300 includes identifying a control shift region between adjacent segments on the roadway. The segments of the plurality of segments each have a lead terminal and an end terminal. For example, the first segment 104 has a lead terminal 114 and an end terminal 116, the second segment 106 has a lead terminal 118 and an end terminal 120, and the third segment 108 has a lead terminal 122 and an end terminal 124. The segments overlap and the overlapping area defines at least a portion of a control shift region.

The control shift region has a first boundary and second boundary that are the lateral ends of the longitudinally arranged segments. Because the control shift region overlaps adjacent segments, the control shift region overlies at least one of the terminals of the adjacent segments. For example, returning to FIG. 1, the first segment 104 and the second segment 106 are adjacent segments. The first boundary of the first control shift region 126 precedes the lead terminal 118 of the second segment 106 by a first distance. Likewise, the second boundary of the first control shift region 126 follows the end terminal 116 of the first segment 104 by a second distance. The first distance may be based on the length of the second segment 106 and the second distance may be based on the length of the first segment. The first distance and the second distance may be based on a predetermined percentage of the length of the second segment 106 and the first segment 104, respectively. The first distance and the second distance may also be determined based on the vehicle data, for example, the speed of the vehicle 102. In another embodiment, the first boundary may be at the lead terminal 118 of the second segment 106 and/or the second boundary may be at the end terminal 116 of the first segment 104. To identify the control shift regions the control module 228 may identify the first boundaries and the second boundaries of the segments.

At block 308, the method 300 includes selectively shifting control from the first set of operators to the second set of operators upon reaching the first boundary of the control shift region. The control shift region defines shared control of the vehicle 102 by a first control entity and a second control entity. For example, the first control shift region 126 of FIG. 1 is an area in which both the first operator 130 and the second operator 132 exert control over the vehicle 102. The shared control in the first control shift region 126 allows for a smooth transition from the first operator 130 to the second operator 132. Likewise, a second control shift region 128 between the second segment 106 and the third segment 108 provides for a smooth transition between the second operator 132 and the third operator 134. The shared control over the vehicle 102 is determined by a control model 228 as described above with respect to FIG. 2. Accordingly, the first operator 130 and the second operator 132 may share control based on the defined control model, the majority action model, the average action model, etc.

Turning to FIG. 4, in the first control shift region 126, the control module 228 implements shared control between the first set 402 of operators and the second set 404 of operators. As discussed above, the first set 402 of operators includes the first operator 130 and the second operator 132, and the second set 404 of operators includes the first operator 130, the second operator 132, and the third operator 134. Suppose the control module 228 implements the majority action model of control. In one embodiment, the control module 228 would allow each operator of the first operator 130, the second operator 132, and the third operator 134 to propose a single candidate action. In another embodiment, the control module 228 may allow each operator to propose a number of candidate actions corresponding to the number of segments the operator is assigned to. For example, the control module 228 would allow the first operator 130 to propose two candidate actions, the second operator 132 to propose two candidate actions, and the third operator 134 to propose a single candidate action.

In another embodiment, in the control shift regions, the control module 228 may phase-in or phase-out any operators that are entering or leaving an operative entity for an upcoming segment. For example, the second set 404 of operators includes each of the operators of the first set 402 of operators with the addition of the third operator 134. Accordingly, the control module 228 may phase-in the third operator 134. For example, suppose that the control module 228 implements the average action model of control. The control module 228 may weight the candidate actions of the first operator 130 and the second operator 132 relative to the third operator 134. For example, initially, the first operator's candidate action may be weighted at 45%, the second operator's candidate action may be weighted at 45% and the third operator's candidate action may be weighted at 10%. The weights of the candidate actions of the first operator 130 and the second operator 132 may decrease and the candidate action of the third operator 134 may increase until the candidate actions of each of the operators in the second set 404 is evenly weighted.

When the vehicle 102 exits the control shift region, for example, by traversing the second boundary, the control of the vehicle 102 resides with a single operative entity, rather than a shifting balance of two operative entities. For example, returning to FIG. 4, the first set 402 of operators has exclusive control of the vehicle 102 in the first segment 104 prior to the first boundary. Likewise, the second set 404 of operators has exclusive control of the vehicle 102 in the second segment 106 following the second boundary. Thus, different operative entities, including sets of operators that have one or more operators, have exclusive control in portions the segments and share control in the control shift regions where control shifts from one operative entity to another.

The control shift regions are specifically purposed to allow for a variable shift in control between the operative entities from one segment to another. The variable shift in control provides a gradual change between operators, thereby streamlining the shift from the perspective of a vehicle occupant. Thus, even though the vehicle 102 may be remotely operated by multiple operators in different segments, the shifts in control may be invisible to the operator.

Figure 5:
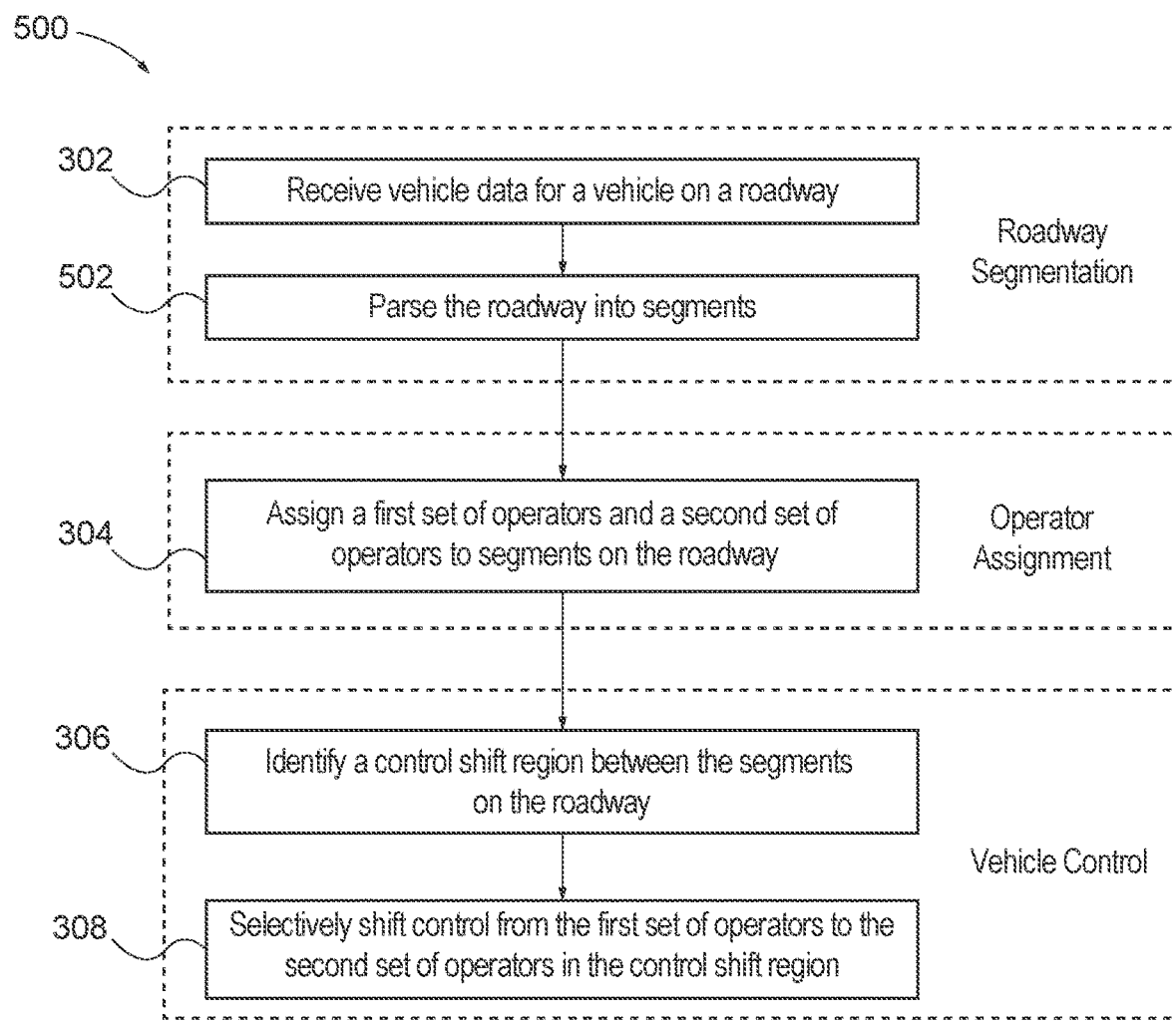
FIG. 5 is a process flow diagram of another method for remote control of a vehicle by multiple operators.

FIG. 5 is a process flow diagram of a method for remote control of a vehicle by multiple operators. The method 500 can be described by the three stages described in FIG. 3 including the roadway segmentation stage, the operator assignment stage, and the vehicle control stage. For simplicity, the method 500 will be described by these stages as well as the steps described above with respect to FIG. 3, but it is understood that the elements of the method 500 can be organized into different architectures, blocks, stages, and/or processes.

Once the vehicle data is received at block 302, the method 500 continues to block 502. At block 502, the method 500 includes partitioning a roadway into segments. Referring to FIG. 1, the roadway 100 is partitioned into segments such as a first segment 104, a second segment 106, and a third segment 108. The parsing module 230 partitions the roadway 100 into the segments based on segmentation data of the vehicle data. As described above, the segmentation data is generally information regarding partitioning of the roadway 100 into segments and may include information regarding location of roadways, segments, road features, length of segments, parameters for segmentation, etc. The segmentation data may be received at the data receiving module 224 from remote vehicles on the roadway 100 as computer communication, from vehicle systems 208 such as the navigation system 232, or the position determination unit 218, etc.

In some embodiments, the parsing module 230 partitions the roadway 100 based on operator information. For example, suppose that the operators operate using the remote server 202. The parsing module 230 may formulate a query to the remote server 202 for specific operator information including geographic region, communication and network availability, network edges, operator style (e.g., aggressive, standard, cautious, convoy, etc.), scheduling availability, length of operator availability in terms of distance and/or time, cost of engaging an operator, etc. In response to the query, the remote processor 240 may access the memory 242 and/or data 244 and transmit the resulting data to the VCD 206 via the communication interface 246. The resulting data is received by the data receiving module 224 and used by the parsing module 230 to partition the roadway 100. For example, the resulting data may include a coverage map that defines the geographic boundaries of an operator's ability to exert remote control as network edges. Therefore, the parsing module 230 may partition the roadway based on the vehicle data, including segmentation data, as well as the operator information. Accordingly, the roadway 100 can be segmented to ensure quality of communication and control in order to provide the vehicle occupant with reliable operation.

Furthermore, the segmentation is performed such that the segments overlap to create control shift regions. The control shift regions are specifically purposed to allow for a variable shift in control between the operative entities from one segment to another. The variable shift in control provides a gradual change between operators, thereby streamlining the shift from the perspective of a vehicle occupant as described at block 304, 306, and 308 of the method 500. Thus, even though the vehicle 102 may be remotely operated by multiple operators in different segments, the shifts in control may be invisible to the operator.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for remote control of a vehicle by a plurality of operators, the computer-implemented method comprising:
   receiving vehicle data for the vehicle, wherein the vehicle is traveling on a roadway parsed into a plurality of segments including a first segment and a second segment, wherein the first segment and the second segment overlap so that an end terminal of the first segment is farther from the vehicle than a lead terminal of the second segment;
   assigning a set of one or more operators of the plurality of operators to each segment of the plurality of segments, wherein the plurality of operators includes a first set of operators assigned to the first segment and a second set of operators assigned to the second segment, wherein a set of one or more operators assigned to a segment remotely operate the vehicle in the segment;
   identifying a control shift region having a first boundary in the first segment and a second boundary in the second segment, wherein the first boundary precedes the lead terminal of the second segment by a first distance, and wherein the first distance is a predetermined percentage of the second segment as a function of the vehicle data associated with a speed of the vehicle; and
   selectively shifting control from the first set of operators to the second set of operators upon reaching the first boundary based on the vehicle data, wherein the first set of operators and the second set of operators exert shared control in the control shift region.

2. The computer-implemented method of claim 1, wherein the second boundary follows the end terminal of the first segment by a second distance, and wherein the second distance is a predetermined percentage of the first segment as a function of the vehicle data associated with the speed of the vehicle.

3. The computer-implemented method of claim 1, wherein selectively shifting control further comprises:
   determining a majority action based on candidate actions of the one or more operators of the first set of operators and the one or more operators of the second set of operators; and
   controlling the vehicle based on the majority action.

4. The computer-implemented method of claim 1, wherein selectively shifting control further comprises:
   determining an average action based on candidate actions of the one or more operators of the first set of operators and the one or more operators of the second set of operators; and
   controlling the vehicle based on the average action.

5. The computer-implemented method of claim 1, wherein selectively shifting control is further based on a control model.

6. The computer-implemented method of claim 1, further comprising parsing the roadway into the plurality of segments.

7. The computer-implemented method of claim 6, wherein parsing the roadway is based on roadway features.

8. The computer-implemented method of claim 6, wherein parsing the roadway is based on network edges.

9. A system for remote control of a vehicle by a plurality of operators, the system comprising:
   a processor that receives vehicle data for a vehicle, wherein the vehicle is traveling on a roadway parsed into a plurality of segments including a first segment and a second segment, segments of the plurality of segments having a lead terminal and an end terminal, wherein the first segment and the second segment overlap so that an end terminal of the first segment is farther from the vehicle than the lead terminal of the second segment;
   the processor that further assigns a set of one or more operators of the plurality of operators to each segment of the plurality of segments, wherein the plurality of operators includes a first set of operators assigned to the first segment and a second set of operators assigned to the second segment, wherein the set of one or more operators assigned to a segment remotely operate the vehicle in the segment; and the processor that further identifies a control shift region having a first boundary and a second boundary and selectively shifting control from the first set of operators to the second set of operators upon reaching the first boundary, wherein the first boundary precedes the end terminal of the first segment and follows the lead terminal of the segment, wherein the first set of operators and the second set of operators exert shared control in the control shift region, wherein the first boundary precedes the end terminal of the first segment by a first distance, and wherein the first distance is a predetermined percentage of the second segment as a function of vehicle data associated with a speed of the vehicle.

10. The system of claim 9, wherein the first set of operators has exclusive control of the vehicle in the first segment prior to the first boundary, and wherein second set of operators has exclusive control of the vehicle in the second segment following the second boundary.

11. The system of claim 9, wherein the processor further determines a majority action based on candidate actions of the one or more operators of the first set of operators and the one or more operators of the second set of operators, and controls the vehicle based on the majority action.

12. The system of claim 9, wherein the processor further determines an average action based on candidate actions of the one or more operators of the first set of operators and the one or more operators of the second set of operators, and controls the vehicle based on the average action.

13. A non-transitory computer-readable storage medium storing instructions that, when executed by a computer, causes the computer to perform a method comprising:

receiving vehicle data for a vehicle, wherein the vehicle is traveling on a roadway parsed into a plurality of segments including a first segment and a second segment, segments of the plurality of segments having a lead terminal and an end terminal, wherein the first segment and the second segment overlap so that an end terminal of the first segment is farther from the vehicle than the lead terminal of the second segment;

assigning a set of one or more operators of a plurality of operators to each segment of the plurality of segments, wherein the plurality of operators includes a first set of operators assigned to the first segment and a second set of operators assigned to the second segment, wherein the set of one or more operators assigned to a segment remotely operate the vehicle in the segment;

identifying a control shift region having a first boundary and a second boundary, wherein the first boundary precedes the end terminal of the first segment and follows the lead terminal of the segment, wherein the first boundary precedes the end terminal of the first segment by a first distance, and wherein the first distance is a predetermined percentage of the second segment as a function of vehicle data associated with a speed of the vehicle; and selectively shifting control from the first set of operators to the second set of operators upon reaching the first boundary, wherein the first set of operators and the second set of operators exert shared control in the control shift region.

14. The non-transitory computer-readable storage medium of claim 13, wherein selectively shifting control further comprises:

determining a majority action based on candidate actions of the one or more operators of the first set of operators and the one or more operators of the second set of operators; and controlling the vehicle based on the majority action.

15. The non-transitory computer-readable storage medium of claim 13, wherein selectively shifting control further comprises:

determining an average action based on candidate actions of the one or more operators of the first set of operators and the one or more operators of the second set of operators; and controlling the vehicle based on the average action.

16. The non-transitory computer-readable storage medium of claim 13, wherein selectively shifting control is further based on vehicle data from the vehicle in the control shift region.

17. The non-transitory computer-readable storage medium of claim 13, wherein the first set of operators has exclusive control of the vehicle in the first segment prior to the first boundary, and wherein second set of operators has exclusive control of the vehicle in the second segment following the second boundary.

* * * * *